Patented Oct. 30, 1934

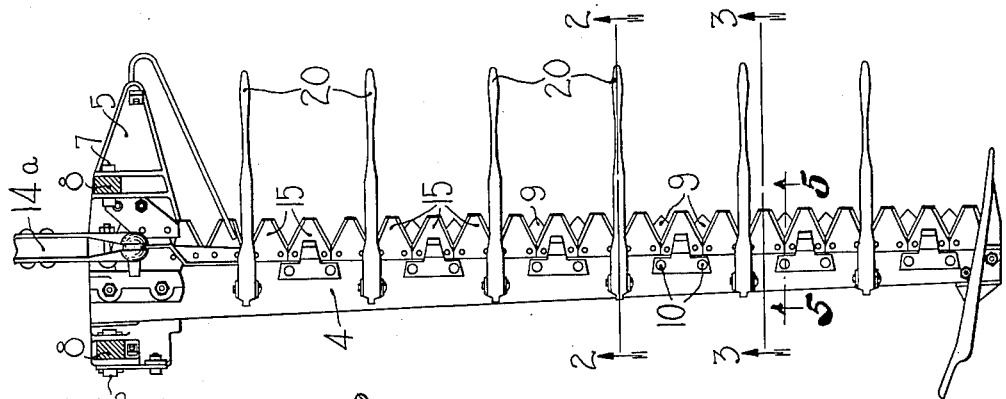

1,979,010

UNITED STATES PATENT OFFICE 1,979,010

CUTTING APPARATUS

Louis A. Paradise, Moline, Ill., assignor to Deere & Company, Moline, Ill., a corporation of Illinois Application May 18, 1933, Serial No. 671,682

4 Claims. (Cl. 56—312)

This invention relates to mowers, and the object thereof is to provide an improved cutting mechanism especially adapted for use in cutting vine crops.

When vine crops, especially peas, are ready to be harvested, they must be cut regardless of weather or field conditions. For this reason it may be necessary to operate in a field which is very soft and wet, and inasmuch as the vines are usually interwoven and sometimes lying flat on the ground, the operation of harvesting peas very often is a difficult one. It usually is necessary to make frequent stops and rake away the vines collected upon the cutting mechanism, and when operating in muddy conditions to occasionally clean the cutting mechanism of mud and refuse which has collected in and around the guard fingers.

A particular object of my invention is the provision of a cutting mechanism for a mower especially adapted for harvesting peas and so designed that it will operate satisfactorily under all working conditions in which it may be called upon to operate, and in which the tendency for cut vines and other material to collect about the cutting mechanism has been reduced to a minimum. I accomplish this object by providing a cutter bar comprising a finger bar equipped with lipless stub guard fingers, and a plurality of lipped guard fingers disposed at spaced intervals between the stub guard fingers with a number of lifting guards, one disposed above each lipped guard finger. A sickle is provided the tips of the knife sections of which extend beyond the ends of the stub guard fingers to cause the sickle in operation not only to cut the pea vines but to cut through all refuse and mud that would otherwise collect on the ends of the conventional guard fingers extending beyond the tips of the knife sections. The lifting guards function to raise the vines from the ground to allow the cutter bar to pass underneath. They have been designed to be relatively narrow to provide the maximum space between adjacent guards and to have substantially parallel side walls so that the space between adjacent lifting guards is substantially as wide at the rear as it is at the tips of the lifting guards, to eliminate the tendency for material to collect or bridge between the guards.

A particular feature of my invention relates to the manner in which the lifting guards are supported on the cutter bar. The lips of the guard fingers disposed below the lifting guards have been extended rearwardly of the cutter bar to a point considerably in rear thereof and have been provided with pivots at the rear ends for pivotally supporting the lifting guards therefrom. Ordinarily a lifting guard is supported upon a bracket fixed to the finger bar back of the sickle. Such a connection in rear of the sickle between the finger bar and the lifting guard forms an obstruction against which cut vines, mud or other foreign matter have a tendency to collect. By supporting the lifting guards on the rear end of the lips of the guard fingers below the lifting guards, there is no necessity for having any connection between the rear ends of the lifting guards and the finger bar. This eliminates an obstruction about which vines and other matter might otherwise collect.

The guard fingers below the lifting guards have been provided with forwardly extending points which project between the two sides of the lifting guards disposed above them, and the lips of the guard fingers have been made relatively narrow to be embraced by the sides of the lifting guards. This provides an overlapping connection between the guard fingers and lifting guards and completely closes the space between the rear end of the tip portions of the lifting guards and the forward edge of the cutter bar and eliminates the possibility of vines, mud or other foreign matter collecting at this point.

A preferred embodiment of my invention is shown and described in the following specification and the accompanying drawing wherein:

Figure 1 is a plan view of my improved cutter bar;

Figure 2 is a cross-sectional view along the line 2—2 of Figure 1 showing one of the lifting guards and the lipped guard finger upon which it is supported in section;

Figure 3 is a cross-sectional view along the line 3—3 of Figure 1;

Figure 4 is a cross-sectional view along the line 4—4 of Figure 2; and,

Figure 5 is a cross-sectional view along the line 5—5 of Fig. 1.

The cutter bar comprises a laterally extending finger bar 4 fixed at its inner end to a shoe 5 which in turn is pivotally connected by means of pivots 6 and 7 to the downwardly extending arms 8 of the shoe arch of the mower. The invention is not concerned with the shoe and shoe arch construction which may be of conventional design, and therefore need not be described in detail.

To the under side of the finger bar 4 a plurality of lipless stub guard fingers 9 are bolted by means of bolts 10. Between each pair of stub guard fingers 9 a specially designed lipped guard finger 11 is provided, these being bolted to the under side of the finger bar 4 by means of bolts 12. Stub guard fingers 9 and lipped guard fingers 11 are provided with ledger plates 13. A sickle 14 operated by means of a pitman 14a is provided. Sickle 14 comprises knife sections 15 carried by the knife back 16 which rests in the recess 17 formed in stub guard fingers 9 and lipped guard fingers 11. Knife sections 15 of the cutter bar bear on the top face of the ledger plates 13. Stub guard fingers 9, as well as the ledger plates 13 carried thereby, are of such length that the tips of the knife sections 15 project slightly beyond the end thereof.

A number of lifting guards 20 are provided on the cutter bar. They are substantially of U-shaped cross-section having substantially parallel sides 21 and 22. The bottom of the tip portion of the lifting guards is closed in by the wall 23 to form a pocket 24 at the rear end thereof. The lips 30 of the lipped guard fingers extend above and rearwardly to a point in back of the sickle 14. Lips 30 are made of U-shaped cross-section comprising base 30a and side walls 30b to obtain a rigid construction. One lifting guard 20 is disposed above each lipped guard finger 11 and is pivotally supported thereby through the agency of a pivot 31 carried by the lip 30 of the guard finger at the rear end thereof, the pivot 31 being disposed between the two side walls 30b. Walls 30b of lip 30 are disposed close enough together to be received between the side walls 21 and 22 of the rear portion of the lifting guard and are made sufficiently high that the side walls 21 and 22 of the lifting guards overlap walls 30b in all positions of the lifting guard. The tips 32 of the lipped guard fingers 11 project into the pockets 24 in the rear end of the forward portion of the lifting guards. This interconnection between the lifting guard fingers 11 and the lipped guards 20 provides an overlapping connection between the two and forms a passageway between adjacent lifting guards of substantially closed side walls the width of which is substantially the same from the tips of the lifting guards to the rear ends thereof.

To yieldingly hold each lifting guard down in operating position a coil spring 34 encircling pivot 31 is provided. One end of spring 34 is anchored in a socket 35 in base 30a of the lip 30 and at the other end bears against the under side of the rear end of a lifting guard 20. Guard 20 may rise and fall with respect to the cutter bar in following the contour of the ground surface within limits established by a stop 36 disposed between walls 21 and 22 and the end 37 of the lower wall 23 of the lifting guard.

What I claim is:—

1. In a cutting mechanism, the combination of a cutter bar comprising a finger bar, a plurality of lipless stub guard fingers fixed thereto, a plurality of lipped guard fingers fixed to the finger bar at spaced intervals between said stub guard fingers, a sickle supported upon said guard fingers, the lips of said lipped guard fingers extending above and rearwardly to a point in back of said sickle, and a plurality of lifting guards disposed one above each of said lipped guard fingers and pivotally connected to the rear end of said lips, each lifting guard having two substantially parallel sides embracing the lip of the guard finger to which it is connected, each lipped guard finger having a forwardly extending tip portion projecting between the two sides of the lifting guard disposed thereabove, to provide an overlapping connection therewith, whereby a passageway is provided between adjacent lifting guards of substantially closed side walls, and an unobstructed space open at the rear is provided beneath the rear end of said lifting guards above the sickle.

2. In a cutting mechanism, the combination of a cutter bar comprising a finger bar, a plurality of spaced guard fingers fixed to the finger bar, a sickle supported upon said guard fingers, said guard fingers having lips extending from the forward ends of the guard fingers above and rearwardly to a point in back of said sickle, and a plurality of lifting guards disposed one above each of said guard fingers and pivotally connected to the rear end of said lips, each lifting guard having two substantially parallel sides embracing the lip of the guard finger to which it is connected, each guard finger having a forwardly extending tip portion projecting between the two sides of the lifting guard disposed thereabove, to provide an overlapping connection therewith, whereby a passageway is provided between adjacent lifting guards of substantially closed side walls and an unobstructed space open at the rear is provided beneath the rear end of said lifting guards above said sickle.

3. In a cutting mechanism, the combination of a cutter bar comprising a finger bar, a plurality of lipless stub guard fingers fixed thereto, a plurality of lipped guard fingers fixed to the finger bar at spaced intervals between said stub guard fingers, a sickle supported upon said guard fingers, the knife sections thereof extending beyond the tips of said stub guard fingers, the lips of said lipped guard fingers extending above and rearwardly to a point in back of said sickle, and a plurality of lifting guards disposed one above each of said lipped guard fingers and pivotally connected to the rear end of said lips, each lifting guard having substantially parallel sides embracing the lip of the guard finger to which it is connected, each lipped guard finger having a forwardly extending tip portion projecting between the two sides of the lifting guard disposed thereabove, to provide an overlapping connection therewith, whereby a passageway is provided between adjacent lifting guards of substantially closed side walls, and an unobstructed space open at the rear is provided beneath the rear end of said lifting guards above said sickle.

4. In a cutting mechanism, the combination of a cutter bar comprising a finger bar, a plurality of spaced guard fingers fixed to the finger bar, a sickle supported upon said guard fingers, said guard fingers having lips extending from the forward ends of the guard fingers above and rearwardly to a point in back of said sickle, and a plurality of lifting guards disposed one above each of said guard fingers and pivotally connected to the rear end of said lips, each lifting guard having two substantially parallel sides embracing the lip of the guard finger to which it is connected, each guard finger having a forwardly extending tip portion projecting between the two sides of the lifting guard disposed thereabove, to provide an overlapping connection therewith, whereby a passageway is provided between adjacent lifting guards of substantially closed side walls and an unobstructed space open at the rear is provided beneath the rear end of said lifting guards above said sickle, means on each lifting guard for limiting the pivotal movement thereof relative to the guard finger upon which it is pivoted, the vertical dimension of said lips and of the sides of said lifting guards being such that the overlap between lifting guards and the lips of the guard fingers is maintained in all positions of the lifting guards relative to the guard fingers.

LOUIS A. PARADISE.